(12) United States Patent
Hoschouer et al.

(10) Patent No.: US 11,400,781 B2
(45) Date of Patent: Aug. 2, 2022

(54) VEHICLE SUSPENSION COMPONENT WITH STIFFENING FEATURE

(71) Applicant: Grouper Stamping LLC, Lexington, KY (US)

(72) Inventors: Clifford J. Hoschouer, Medina, OH (US); Anthony Santamaria, North Ridgeville, OH (US)

(73) Assignee: GROUPER STAMPING, LLC, Lexington, KY (US)

( * ) Notice: Subject to any disclaimer, the term of this patent is extended or adjusted under 35 U.S.C. 154(b) by 0 days.

(21) Appl. No.: 17/257,672

(22) PCT Filed: Jul. 3, 2019

(86) PCT No.: PCT/US2019/040500
§ 371 (c)(1),
(2) Date: Jan. 4, 2021

(87) PCT Pub. No.: WO2020/010199
PCT Pub. Date: Jan. 9, 2020

(65) Prior Publication Data
US 2021/0213795 A1    Jul. 15, 2021

Related U.S. Application Data

(60) Provisional application No. 62/694,346, filed on Jul. 5, 2018.

(51) Int. Cl.
*B60G 7/00* (2006.01)
(52) U.S. Cl.
CPC ...... *B60G 7/001* (2013.01); *B60G 2200/1424* (2013.01); *B60G 2206/122* (2013.01);
(Continued)

(58) Field of Classification Search
CPC ............ B60G 7/001; B60G 2200/1424; B60G 2206/122; B60G 2206/16; B60G 2206/722; B60G 2206/8102; B60G 2206/8201
See application file for complete search history.

(56) References Cited

U.S. PATENT DOCUMENTS

| | | |
|---|---|---|
| 5,695,213 A | 12/1997 | Nakamura et al. |
| 2005/0104315 A1 | 5/2005 | Howell et al. |

(Continued)

FOREIGN PATENT DOCUMENTS

JP    2015071411 A    4/2015

OTHER PUBLICATIONS

International Search Report and Written Opinion issued for PCT/US2019/040500 dated Oct. 24, 2019, 12 pages.
(Continued)

*Primary Examiner* — Darlene P Condra
(74) *Attorney, Agent, or Firm* — Reising Ethington, P.C.

(57) ABSTRACT

A vehicle suspension component, such as a lower control arm, that includes first and second stamped metal shells, a stiffening feature, and several connection nodes for operably connecting the suspension component to the rest of the vehicle suspension system. The first and second stamped metal shells may be stamped from next generation steel that is lightweight and strong, and are joined together in a clam shell or box-style type design so that the connections nodes are sandwiched therebetween. The stiffening feature may include a depression, a depression perimeter that at least partially surrounds the depression, a depression sidewall, a depression floor, and a depression weld, wherein the depression weld joins the shell interior surfaces of the first and second stamped metal shells together.

19 Claims, 3 Drawing Sheets

(52) U.S. Cl.
CPC .... *B60G 2206/16* (2013.01); *B60G 2206/722* (2013.01); *B60G 2206/8102* (2013.01); *B60G 2206/8201* (2013.01)

(56) References Cited

U.S. PATENT DOCUMENTS

| | | |
|---|---|---|
| 2010/0066050 A1 | 3/2010 | Miyawaki et al. |
| 2010/0264615 A1* | 10/2010 | Guttilla .................. B23P 15/00 280/124.134 |
| 2012/0021241 A1 | 1/2012 | Perry et al. |
| 2012/0098228 A1* | 4/2012 | Wilson .................. B60G 7/005 280/124.134 |
| 2018/0105002 A1* | 4/2018 | Watanabe ................ B60G 3/04 |
| 2020/0324599 A1* | 10/2020 | Frenzel .................. B60G 7/001 |
| 2021/0190134 A1* | 6/2021 | Kuroda ................ F16C 11/069 |

OTHER PUBLICATIONS

International Preliminary Report On Patentability issued for PCT/US2019/040500 dated Jan. 14, 2021, 9 pages.

* cited by examiner

VEHICLE SUSPENSION COMPONENT WITH STIFFENING FEATURE

REFERENCE TO RELATED APPLICATIONS

This application claims the benefit of U.S. Provisional Ser. No. 62/694,346 filed on Jul. 5, 2018, the entire contents of which are incorporated herein by reference.

FIELD

The present disclosure relates to a vehicle component and, more specifically, to a vehicle suspension component, such as a control arm, that is made of stamped sheet metal and includes a stiffening feature.

BACKGROUND

There are substantial efforts being made in the automotive industry to reduce the weight of the vehicle, which typically results in a corresponding improvement in fuel efficiency, without compromising the component in terms of strength, stiffness, durability, etc. Furthermore, there is strong desire to utilize cost effective manufacturing methods, such as stampings, where possible. The vehicle suspension component and method of the present disclosure are designed to address and balance these and other objectives so that a light weight, sufficiently stiff and cost effective vehicle suspension component can be provided.

SUMMARY

According to one aspect, there is provided a vehicle suspension component, comprising: a first stamped metal shell that includes a shell interior surface and a shell exterior surface; a second stamped metal shell that includes a shell interior surface and a shell exterior surface; and a stiffening feature that is formed in at least one of the first or second stamped metal shells and includes a depression, a depression perimeter that at least partially surrounds the depression, a depression sidewall that is connected to the depression perimeter, a depression floor that is connected to the depression sidewall, and a depression weld that is at least partially located in the depression floor, wherein the depression weld joins the shell interior surfaces of the first and second stamped metal shells together.

According to various embodiments, the vehicle suspension component may further include any one of the following features or any technically-feasible combination of some or all of these features:
- at least one of the first or second stamped metal shells is made from a next generation steel that has a yield strength, after forming, that is equal to or greater than 780 MPa along a load-bearing path and has an elongation, after forming, that is equal to or greater than 30%;
- at least one of the first or second stamped metal shells has an average thickness of between 1.0 mm and 5.0 mm and is made from a next generation steel that is selected from the group consisting of: advanced high-strength steels (AHSS), third generation steels (Gen3 steels), fourth generation steels (Gen4 steels), or press hardenable or hot stamped steels;
- at least one of the first or second stamped metal shells includes a shell connection node portion that is integrally formed in the at least one stamped metal shell and is configured to receive a connection node, and the connection node is configured to connect the vehicle suspension component to the rest of a vehicle suspension system;
- the first and second stamped metal shells are complementary in shape and form a clam-shell or a box-style type design, and one or more connection nodes are sandwiched between the first and second stamped metal shells;
- the stiffening feature is formed in both the first and second stamped metal shells and each of the first and second stamped metal shells includes a depression, a depression perimeter that at least partially surrounds the corresponding depression, a depression sidewall that is connected to the corresponding depression perimeter, a depression floor that is connected to the corresponding depression sidewall, and a depression weld that is at least partially located in both of the depression floors, wherein the depression weld joins the shell interior surfaces of the first and second stamped metal shells together;
- the stiffening feature is formed in only one of the first and second stamped metal shells and the one stamped metal shell includes a depression, a depression perimeter that at least partially surrounds the depression, a depression sidewall that is connected to the depression perimeter, a depression floor that is connected to the depression sidewall, and a depression weld that is at least partially located in the depression floor, wherein the depression weld joins the shell interior surfaces of the first and second stamped metal shells together;
- the stiffening feature with the depression weld forms a welded double thickness section that increases the stiffness of the vehicle suspension component, and the welded double thickness section is located towards the middle of the vehicle suspension component such that it is inboard of an outer periphery of the vehicle suspension component;
- the depression sidewall extends from the depression perimeter down to the depression floor and includes a first radius between the depression perimeter and the depression sidewall and a second radius between the depression sidewall and the depression floor;
- the first radius and the second radius are equal to or greater than a thickness of the first or second stamped sheet metal shell in which they are formed;
- the depression sidewall has a varying height dimension x that is between 4.5 mm and 45 mm, inclusive;
- the depression floor forms a foundation of the stiffening feature and is substantially flat or planar such that it can lay flat against the other of the first or second stamped metal shells;
- the width Y of the stiffening feature is at least 50% of the corresponding width W of the vehicle suspension component in that area;
- the depression weld is a curvilinear laser weld that follows a perimeter of the depression floor such that it is located inboard of the depression sidewall by a dimension Z, and the depression weld is located closer to the corresponding sidewall (dimension Z) than a middle of the depression floor for at least a portion of a length of the depression weld;
- the depression weld is spaced from the depression sidewall by a distance Z that is between 1.5 mm and 10 mm, inclusive, for at least a portion of a length of the depression weld;
- the depression weld is a continuous weld that extends around a weld loop within the depression floor;

the stiffening feature further includes a cutout formed in the depression floor and a step formed at a periphery of the cutout, the cutout is located at least partially inboard of the depression weld;

the stiffening feature further includes a cutout formed in the depression floors of both of the first and second stamped metal shells, the cutout is located at least partially inboard of the depression weld; and the vehicle suspension component is a lower control arm that includes a ball joint connection node for attachment to a ball joint, a bushing pin connection node for attachment to a bushing pin, and a bushing connection node for attachment to a bushing.

According to another aspect, there is provided a method for manufacturing a vehicle suspension component, the method comprising the steps of:

stamping a first stamped metal shell that includes a shell interior surface and a shell exterior surface;

stamping a second stamped metal shell that includes a shell interior surface and a shell exterior surface, wherein at least one of the first and second stamped metal shells has a stiffening feature that includes a depression, a depression perimeter that at least partially surrounds the depression, a depression sidewall that is connected to the depression perimeter, and a depression floor that is connected to the depression sidewall; and joining the shell interior surfaces of the first and second stamped metal shells together by forming a depression weld that is at least partially located in the depression floor.

DRAWINGS

Preferred exemplary embodiments will hereinafter be described in conjunction with the appended drawings, wherein like designations denote like elements, and wherein.

DESCRIPTION

In an effort to reduce weight and increase the stiffness of vehicle components, new materials and methods of manufacture have been developed, especially for vehicle suspension components that are load bearing. Suspension components such as, but not limited to, control arms (e.g., upper control arms, lower control arms, and wishbone control arms) and linkages or joints (e.g., an attachment component for a knuckle, upright, axle or other link) are oftentimes located in load bearing positions of a suspension system and require a certain degree of stiffness and/or strength. Such suspension components may have one or more degrees of force acting on the component at any given point in time. Because suspension components may need to withstand both static and dynamic forces acting upon them, they are typically designed to be as stiff as possible. However, increasing the stiffness of a suspension component can correspondingly increase the weight of the component. Balancing stiffness requirements with the desire for a lightweight solution is effectively achieved with the vehicle suspension component described herein.

Figure 1:
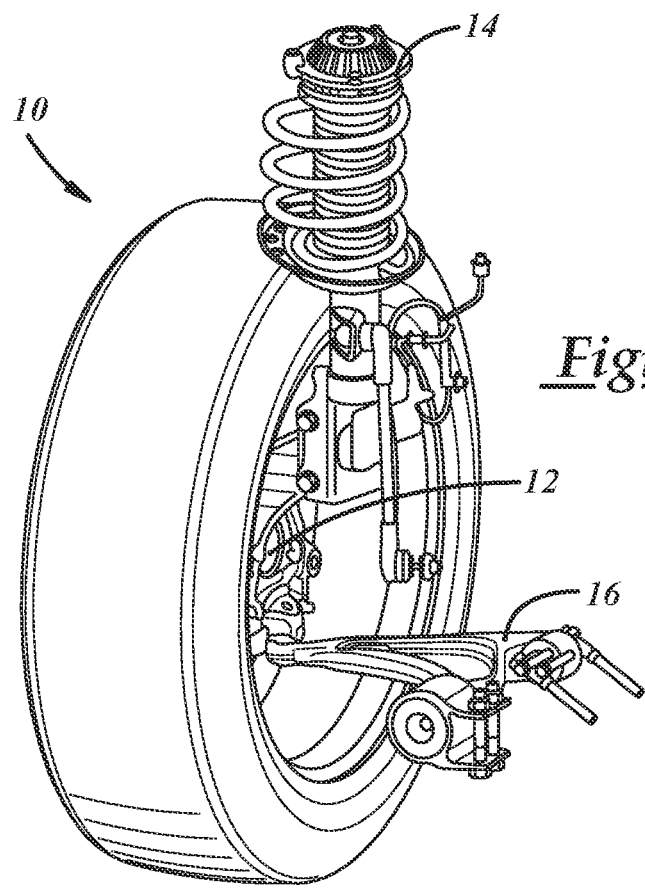
FIG. 1 is a partial perspective view of a vehicle corner having a wheel and several suspension components, including a lower control arm.
Figure 2:
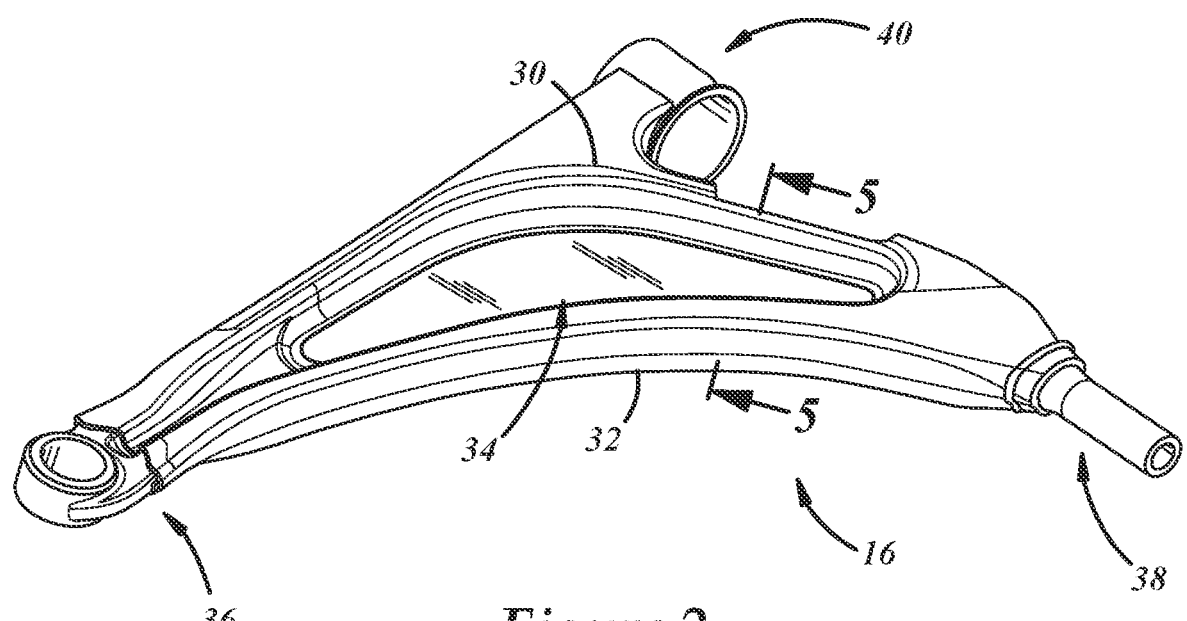
FIG. 2 is a perspective view of the lower control arm of FIG. 1.
Figure 3:
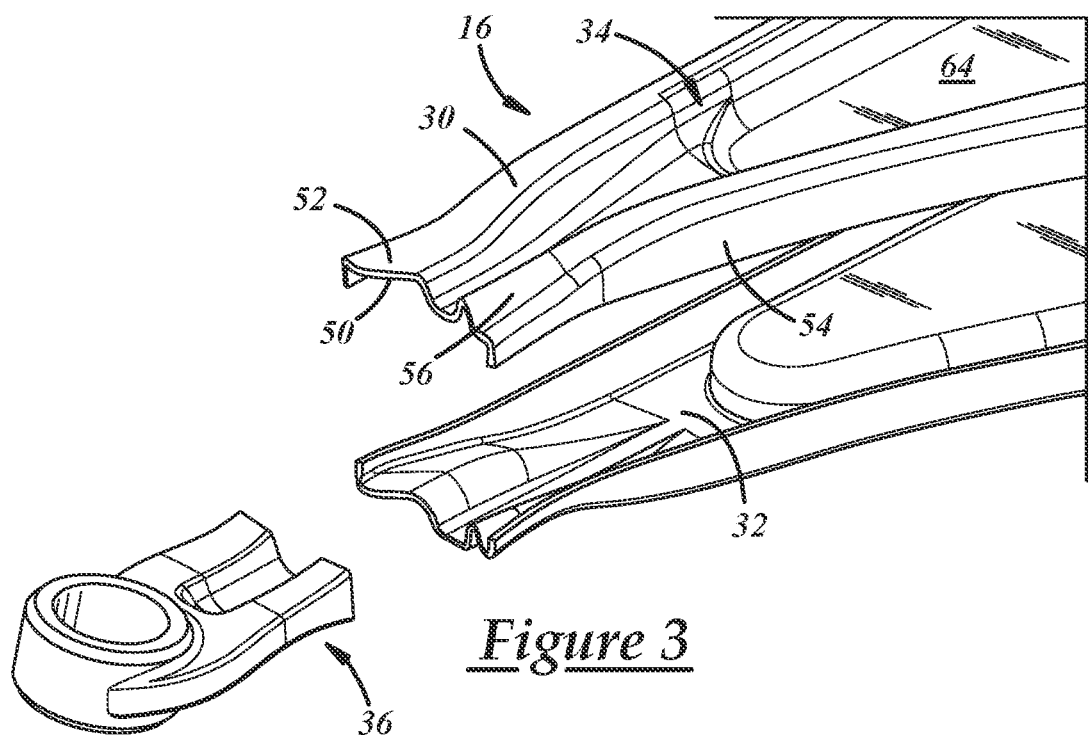
FIG. 3 is an exploded perspective view of the lower control arm of FIG. 2 near a connection node for a ball joint, where the view shows first and second stamped metal shells before they are joined together.
Figure 4:
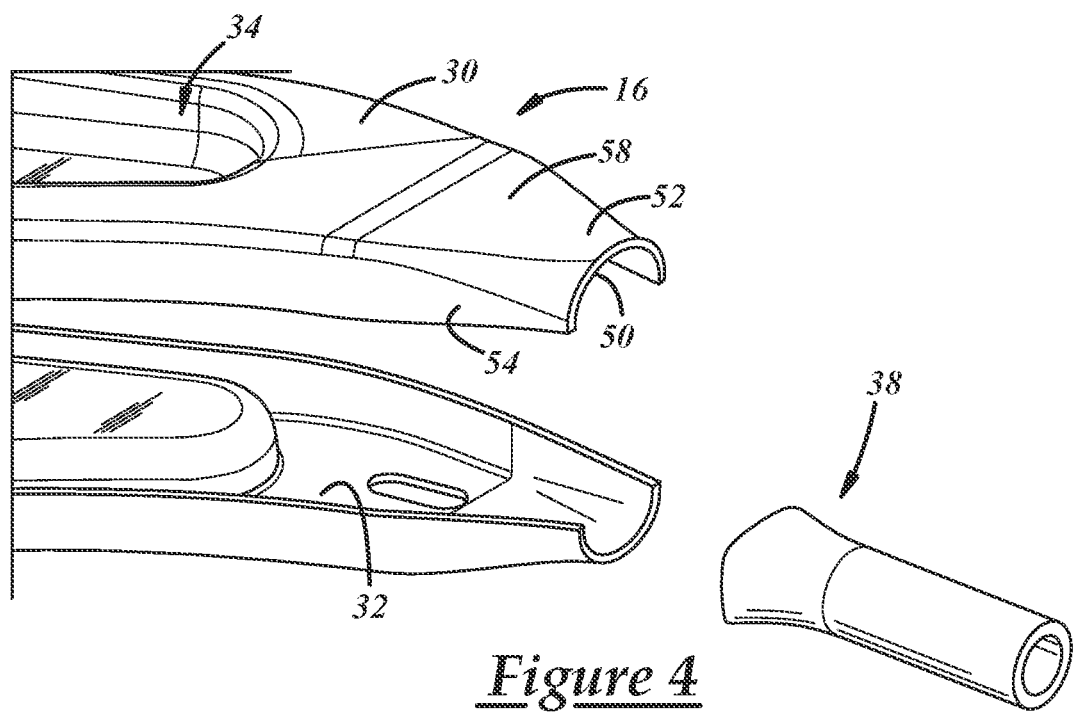
FIG. 4 is an exploded perspective view of the lower control arm of FIG. 2 near a connection node for a bushing pin, where the view shows first and second stamped metal shells before they are joined together.

With reference to FIG. 1, a vehicle corner 10 is shown having a wheel 12, a suspension component in the form of a strut 14, and a suspension component in the form of a lower control arm 16. Although the suspension component of the present application is shown in this particular embodiment as a lower control arm 16, it should be appreciated that other suspension components, like upper control arms, wishbone control arms, linkages, joints, etc. could be used instead. Accordingly, the present application is not confined to a lower control arm, as that is merely one non-limiting example or embodiment of the present suspension component. Turning now to FIGS. 2-4, the lower control arm 16 is a multi-piece component that is arranged according to a clam shell or box-style type design and includes a first stamped metal shell 30, a second stamped metal shell 32, a stiffening feature 34, and connection nodes 36-40. The term "stamped," as used herein, broadly means all stamped, drawn, deep drawn or similarly formed metal parts and is not strictly limited to traditional stamping only.

The first stamped metal shell 30 makes up roughly half of the body of the lower control arm 16 (e.g., the upper half of the body in the example shown in the drawings). The metal shell 30 is preferably a stamped part, as opposed to a forged or cast part, and is made from a sheet metal material, such as a so-called next generation steel. The term "next generation steel," as used herein, broadly includes any steel having a yield strength, after forming, that is equal to or greater than 780 MPa along a load-bearing path and having an elongation, after forming, that is equal to or greater than 30%. Some non-limiting examples of next generation steels include, but are not limited to, advanced high-strength steels (AHSS), third generation steels (i.e., Gen3 steels), fourth generation steels (i.e., Gen4 steels), certain press hardenable or hot stamped steels, etc. The metal shell 30 may have any gauge or thickness suitable for the application in which it is being used, and it may have a uniform thickness or a variable thickness across the part prior to and/or after forming. According to one example, the metal shell 30 is stamped from next generation steel and has an average thickness of between 1.0 mm and 5.0 mm, inclusive; even more preferably, the metal shell 30 is stamped from next generation steel having an average thickness of between 1.5 mm and 4.0 mm, inclusive. As shown best in FIGS. 3-4, the metal shell 30 has a shell interior surface 50, a shell exterior surface 52, a shell perimeter 54, and shell connection node portions 56, 58 that receive connection nodes 36, 38, respectively.

The shell interior and exterior surfaces 50, 52 are located on opposite interior and exterior sides of the first stamped metal shell 30, respectively, and are separated from one another by the thickness of the part. As explained later in more detail, the shell interior surface 50 contacts and is joined to a corresponding interior surface of the second stamped metal shell 32 in the area of the stiffening feature 34. The shell perimeter 54 generally follows the outside or periphery of the part and creates a raised plateau-like section that at least partially surrounds a depression or recess of the stiffening feature 34. The height and/or width of the shell perimeter 54 may be uniform or may vary, depending on the particular needs and requirements of the application, and helps define the shape and structure of the stiffening feature 34.

The shell connection node portions 56, 58 are areas of the metal shell 30 where the part is designed to receive and be securely attached to connection nodes 36, 38, such as those having a ball joint or bushing, which in turn operably connect the lower control arm 16 to the rest of the vehicle suspension system. There is another shell connection node portion that receives bushing connection node 40, but it is not separately numbered. In the present embodiment, each of the shell connection node portions provides a surface for welding or otherwise joining the metal shell 30 to the corresponding connection node. The metal shell 30 is not limited to any particular shell connection node portion arrangement, as portion 56 generally includes a sharper more squared-off flange that joins with a ball joint connection node 36 (see FIG. 3), whereas portion 58 generally includes a more rounded flange that compliments a bushing pin connection node 38 (see FIG. 4). The illustrated configuration, which includes the ball joint connection node 36, the bushing pin connection node 38, and a bushing connection node 40 are illustrative of a three-point control arm. However, it should be appreciated that the present suspension component may have more or less connection nodes than shown here, it may have different types of connection nodes than shown here, or it may have a different arrangement altogether in terms of connection nodes, as these are merely examples.

The second stamped metal shell 32 is similar to the first stamped metal shell 30 so that the two metal shells can be joined together to form a clam-shell or box-style like design. Unless specified, the second stamped metal shell 32 can be assumed to have the same parts, features, materials, characteristics, etc. as described above in conjunction with the first stamped metal shell 30 (equivalent features are identified with the same number, except the reference numerals are primed). Thus, a full, duplicative description of the second stamped metal shell has been omitted in favor of the description above, which applies here as well. In the embodiment shown in the drawings, the first and second stamped metal shells 30, 32 are largely mirror images of one another such that the stiffening feature 34 includes the combination of complementary depressions or recesses 68, 68' formed in each of the first and second stamped metal shells 30, 32, respectively. The lower control arm 16 is not limited, however, to such a configuration.

In another embodiment where the first and second stamped metal shells 30, 32 are not mirror images of one another, only one of the metal shells includes a stamped depression or recess that is part of the stiffening feature 34, while the other metal shell does not. For instance, it is possible for the first stamped metal shell 30 to have a depression 68 so that the interior surface 50 contacts and mates with the second stamped metal shell 32 which lacks such a depression (this embodiment not shown), or vice versa. A thinner gauge and/or less stiff sheet metal may be used for the metal shell 30 with the depression, while a thicker gauge and/or more stiff sheet metal may be used for the metal shell 32 lacking a depression, although this is optional. In such an embodiment, the stiffening feature 34 would only include the depression 68 in the first metal shell 30, as opposed to depressions in both metal shells. Even though the first stamped metal shell 30 is shown in the drawings as the upper component or piece and the second stamped metal shell 32 is shown as the lower component or piece, the first and second stamped metal shells 30, 32 may be provided in any suitable orientation, depending on the specific needs of a given suspension component. Furthermore, the first and second stamped metal shells 30, 32 may be made of metals having the same thickness or different thicknesses, and the types of metal used may be the same or they may be strategically different.

Figure 5:
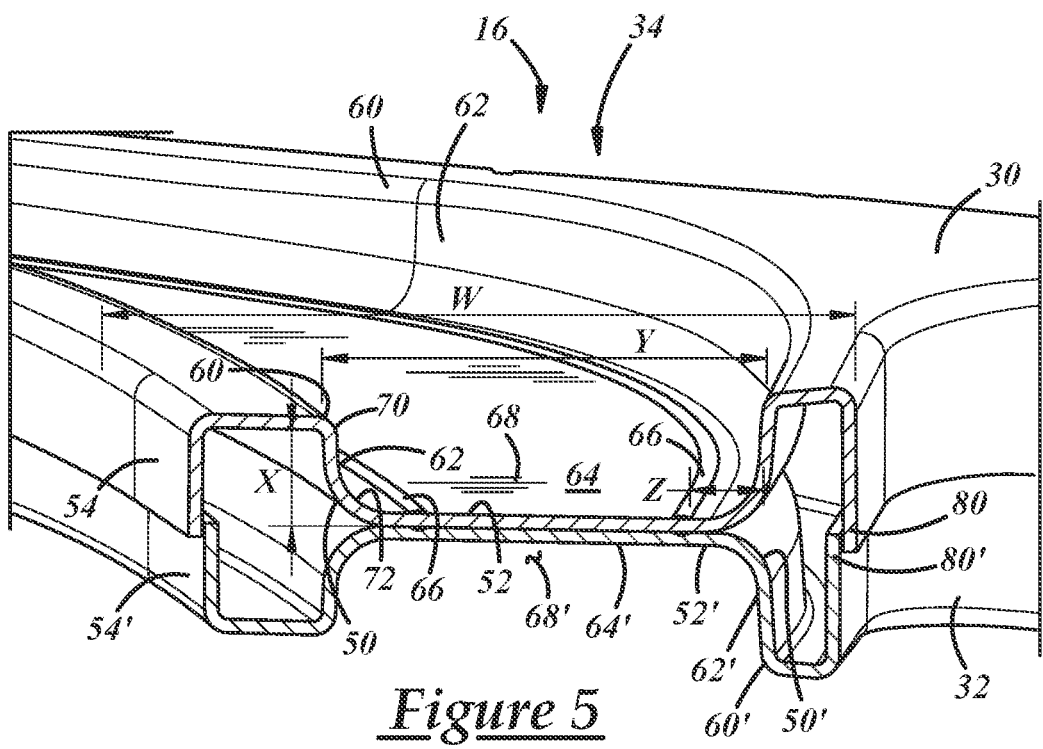
FIG. 5 is a cross-sectional view of the lower control arm of FIG. 2 taken along the line 5-5, where the cross-sectional view shows the stiffening feature having a depression, a depression perimeter, a depression floor, and a depression weld.

The stiffening feature 34 is designed to improve the stiffness, strength and/or integrity of the part, without substantially increasing its weight. The stiffening feature 34 enables the first and second stamped metal shells 30, 32 to be brought together and joined at a weld 66, which is located towards the middle of the part such that it is inboard of the outer periphery of the part, and is different than other multi-piece components that are only welded along the outside or periphery of the part. The welded double thickness of the part at the stiffening feature 34 (i.e., the combined thicknesses of the first and second stamped metal shells 30, 32 in that area) increases the stiffness, strength and/or integrity of the part, while still enabling the lower control arm 16 to have a lightweight clam shell or box type geometry. It is should be noted that the lower control arm 16 may or may not also be welded along the outer periphery of the part where the flanged sections of the first and second stamped metal shells 30, 32 overlap one another, in addition to the depression weld 66. With reference to the example shown in FIG. 5, the stiffening feature 34 includes a depression perimeter 60, depression sidewalls 62, a depression floor 64, a depression weld 66, and a depression or recess 68. Because the first and second stamped metal shells 30, 32 shown in FIG. 5 are generally mirror images of one another, a full duplicative description of depression features 60', 62', 64', 68', etc. has been omitted. It should be understood that, unless specified otherwise, the description provided to one set of depression features applies equally to the other.

The depression perimeter 60 generally surrounds the depression 68 and, to some degree, helps define the stiffening feature 34. The depression sidewalls 62 extend from the depression perimeter 60 down to the depression floor 64 and, depending on the stiffness and/or strength requirements in a certain area of the part, can have different degrees of slope or incline. In the illustrated example, the transition from depression perimeter 60 to depression sidewall 62 is defined by a first radius 70 and the transition from depression sidewall 62 to depression floor 64 is defined by a second radius 72. The slope or incline of the depression sidewall 62, as well as the first and second radii, can affect the stiffness of the part. For instance, the greater the slope of the depression sidewall 62 (i.e., the more vertical the depression sidewall), the greater the vertical stiffness; and the smaller the radii of the first and second radii (i.e., the tighter the radii), the greater the stiffness. It is oftentimes preferable that the first and second radii each have an inner radius that is approximately the same. The slope and radii will generally need to be balanced with the ability to form the part into the desired shape. According to one non-limiting example, the depression sidewall 62 has a varying height dimension x that is between 4.5 mm and 45 mm, inclusive (e.g., between about 13 mm and 20 mm, inclusive), and extends between a first radius 70 and a second radius 72, where each of the radii is equal to or greater than the thickness of the sheet metal of the metal shell 30 (e.g., greater than 1.5 mm).

The depression floor 64 generally forms the floor or foundation of the stiffening feature 34 and is at least partially surrounded by depression sidewalls 62. According to the illustrated embodiment in FIG. 5, the depression floor 64 is substantially flat or planar so that it can lay flat against a corresponding depression floor 64' of the opposing metal shell 32 and it is a solid or uninterrupted surface. In other embodiments, however, the depression floor 64 may be slightly concave or convex, it may have a series of holes or cutouts for further weight reduction (see, for example, the embodiments in FIGS. 6 and 7), or it could have attachment features to connect to other components of the vehicle suspension system, to cite a few possibilities. In the example where both depression floors 64, 64' are slightly convex (not shown), the first and second stamped metal shells 30, 32 could bow away from each other in the middle of the depression floors, but could still be welded together by depression weld 66 out towards the depression sidewalls 62. In the example where the depression floors 64, 64' have holes, cutouts, slits, slots and/or other openings, such as in FIGS. 6 and 7, the openings could further reduce the weight of the part or they could be strategically located to relieve stress or strain during stamping, drawing and/or other manufacturing processes. As for the example where the depression floor 64 includes additional attachment features, the depression floor may accommodate fasteners (e.g., bolts or pins) such that the control arm can connect to other suspension components. In terms of providing sufficient stiffness and/or strength, in at least some part of the lower control arm 16, it may be preferable for the width Y of the stiffening feature 34 to be at least 50% of the corresponding width W of the component in that area. The preceding examples are just some of the potential modifications that could be made to the exemplary embodiment shown in the drawings, as other modifications also exist.

The depression weld 66 helps join the first and second stamped metal shells 30, 32 together and is at least partially located on the depression floor 64. The depression weld 66 may be a curvilinear laser weld that is formed from one side of the part (i.e., the laser only impinges the part from one side, as opposed to both sides, and is a through weld) such that it fully penetrates at least one depression floor 64 and at least partially extends into the opposing depression floor 64'. The depression weld 66 may follow the perimeter of the depression floor 64 such that it is located slightly inboard of the depression sidewalls 62 by a dimension Z so that the weld is closer to the sidewalls 62 than the middle of the depression floor 64. In terms of stiffness, it may be preferable that the depression weld 66 be as close as possible to the outer periphery of the depression floor 64 (i.e., the distance Z be as small as possible), however, manufacturing limitations could limit this. According to a non-limiting example, the depression weld 66 is spaced from the depression sidewalls 62 by a distance Z that is between 1.5 mm and 10 mm, inclusive. In addition, the depression weld 66 may be a single continuous weld that fully extends around a weld loop or weld path within the depression and closes on itself in an unbroken fashion. It should be recognized that while some exemplary characteristics of the depression weld 66 are described above, the present application is not limited to such, as the depression weld can be a type of weld other than a laser weld, it can be located towards the middle of the depression floor 64, it can be a discontinuous or interrupted weld having one or more segments, it can include multiple welds, or it can include mechanical or other fastening mechanisms, to cite several possibilities. In one example where multiple depression welds 66 are used, one weld may form a ring around another weld so that the welds are generally concentric. It is also possible for an adhesive (e.g., a structural adhesive) to be used in addition to or in lieu of the depression weld 66, depending on the particular requirements of the application.

The depression 68 may include one or more depressions, recesses, indentations and/or other features formed in the first stamped metal shell 30. In one example, the depression 68 is stamped or drawn into the metal shell 30 when that part is being manufactured. The width, depth, shape and/or other characteristics of the depression 68 are largely dictated by the requirements and particularities of the application in which it is being used, as the depression does not have to have the exact same configuration that is shown in the drawings. As mentioned above, it is possible for the first and second stamped metal shells 30, 32 to each have a depression 68, 68' (shown in the drawings), or it is possible for only one of the first or second stamped metal shells 30, 32 to have a depression.

In addition to joining the first and second stamped metal shells 30, 32 together at the depression weld 66, the metal shells may also be joined at the various connection nodes 36-40 and/or around the outer perimeter of the part. For example, the first and second stamped metal shells 30, 32 may also be welded or otherwise joined at connection nodes 36-40 and along their box-style overlapping edges 80, 80', as shown in FIG. 5. In other embodiments, a flanged clam-shell type style may be used (i.e., where the overlapping edges are further bent so that they are horizontally aligned with one another, as opposed to being vertically aligned, as in the orientation of FIG. 5) or other means of connecting the first metal sheet and second metal sheet may also be used (e.g., hemming or riveting).

According to an exemplary manufacturing process, each of the first and second stamped metal shells 30, 32 is formed by stamping the parts from a suitably thick sheet metal material, such as those made from a next generation steel, such that one or both of the metal shells includes a depression 68, 68'. The various components for the connection nodes 36-40 are then provided (e.g., the ball joint connection node 36, the bushing connection nodes 38, 40 may be separately manufactured and provided according to known forging, casting and/or other operations). Next, the connection nodes 36-40 are aligned and positioned between the shell connection node portions 56, 58 of the first and second stamped metal shells 30, 32 (see FIGS. 3 and 4) so that the components can be assembled together. The assembly step includes welding the metal shells 30, 32 together at the depression weld 66, as well as along the outer overlapping edges 80, 80'. In addition, one or more welds may be used to secure the connection nodes 36-40 to shell connection node portions 56, 58 of the metal shells.

Figure 6:
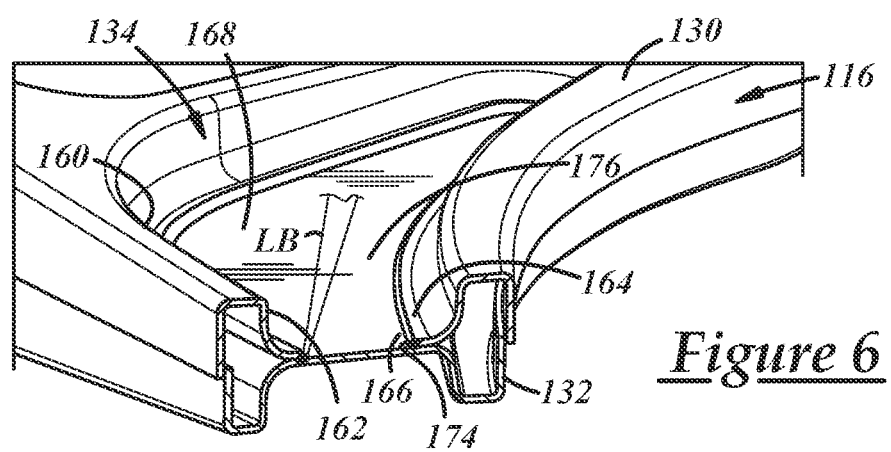
FIG. 6 is a cross-sectional view of another embodiment of a control arm, where one of the stamped metal shells has a cutout in the depression floor.
Figure 7:
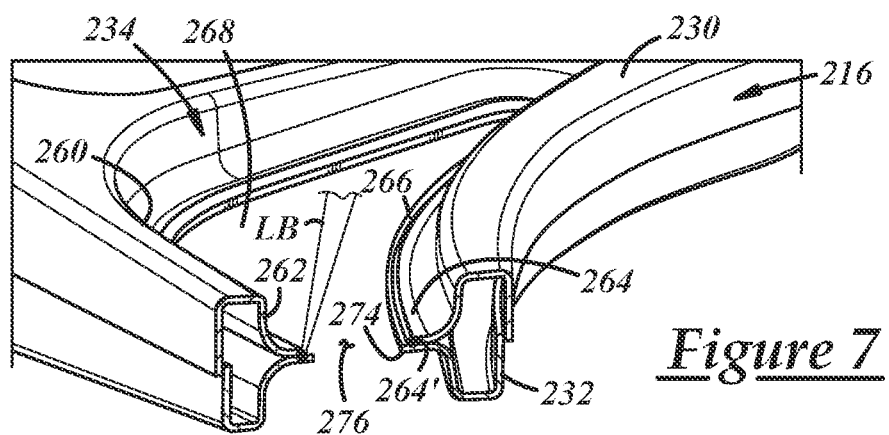
FIG. 7 is a cross-sectional view of another embodiment of a control arm, where both of the stamped metal shells have a cutout in the depression floor.

Turning now to FIGS. 6 and 7, there are shown several other embodiments of a lower control arm where cutouts are used to further reduce the weight of the part. In the embodiment of FIG. 6, a lower control arm 116 has a cutout 164 in the depression floor of one of the metal shells, whereas in the embodiment of FIG. 7, a lower control arm 216 has a cutout 264 in the depression floor of both of the metal shells. Unless specified, the lower control arms 116, 216 can be assumed to have the same parts, features, materials, characteristics, etc. as described above in conjunction with the lower control arm 16 (equivalent features are typically identified with the same number, except the reference numerals have one or two hundred added thereto). Thus, a full, duplicative description of the lower control arms 116, 216 have been omitted in favor of the description above, which applies here as well.

Starting with FIG. 6, the lower control arm 116 is a multi-piece component that is arranged according to a clam shell or box-style type design and includes a first stamped metal shell 130, a second stamped metal shell 132, a stiffening feature 134, and connection nodes (not shown). The stiffening feature 134, in turn, includes a depression perimeter 160, depression sidewalls 162, a depression floor 164, a depression weld 166, a depression or recess 168, as well as a cutout 176 located inboard of the depression weld 166. In the illustrated example, the cutout 176 is formed in the first stamped metal shell 130 (alternatively, it could be formed in the second shell 132), so that the lower control arm 116 is only one layer thick in the area that is at the bottom of the depression recess 168; this may result in a substantial weight savings, or it may provide the part with certain stress or strain relieving features, to cite several possibilities. The periphery or boundary that defines the cutout 176 may be located slightly inboard of the depression weld 166 (i.e., towards the center of the part), so that there is enough material from the depression floors of the first and second stamped metal shells 130, 132 for a laser or electron beam LB to create depression weld 166. The laser beam LB may be inclined at an angle so as to impinge or strike the stacked shell layers at a step 174 formed at the periphery of the cutout 176. Of course, other welding and/or other attachment mechanisms may be used instead (e.g., adhesives, fasteners, etc.).

In FIG. 7, the lower control arm 216 is a multi-piece component that is arranged according to a clam shell or box-style type design and includes a first stamped metal shell 230, a second stamped metal shell 232, a stiffening feature 234, and connection nodes (not shown). The stiffening feature 234, in turn, includes a depression perimeter 260, depression sidewalls 262, a depression floor 264, a depression weld 266, a depression or recess 268, as well as a cutout 276. In this example, the cutout 276 is formed in both the first and second stamped metal shells 230, 232 so that the lower control arm 116 is completely open in the area that is at the bottom of the depression recess 268; this may result in a substantial weight savings, or it may provide the part with certain stress or strain relieving features, to cite several possibilities. The periphery that defines the cutout 276 in the second shell 232 may be located slightly inboard of both the depression weld 266 and the periphery that defines the cutout in the first shell 230 (i.e., located towards the center of the part so that the two peripheries are offset or stepped, as opposed to being flush). The amount that the two peripheries are offset or staggered should be such that it provides enough material from the first and second stamped metal shells 230, 232 for a laser or electron beam LB to create depression weld 266. As with the previous example, the laser beam LB may be inclined at an angle so as to impinge or strike the stacked shell layers at the step 274 formed at the peripheries of the cutout 276. Of course, other welding and/or other attachment mechanisms may be used instead (e.g., adhesives, fasteners, etc.).

It is to be understood that the foregoing description is not a definition of the invention, but is a description of one or more exemplary illustrations of the invention. The invention is not limited to the particular example(s) disclosed herein, but rather is defined solely by the claims below. Furthermore, the statements contained in the foregoing description relate to particular exemplary illustrations and are not to be construed as limitations on the scope of the invention or on the definition of terms used in the claims, except where a term or phrase is expressly defined above. Various other examples and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A vehicle suspension component, comprising:
a first stamped metal shell that includes a shell interior surface and a shell exterior surface;
a second stamped metal shell that includes a shell interior surface and a shell exterior surface; and
a stiffening feature that is formed in at least one of the first or second stamped metal shells and includes a depression, a depression perimeter that at least partially surrounds the depression, a depression sidewall that is connected to the depression perimeter, a depression floor that is connected to the depression sidewall, and a depression weld that is at least partially located in the depression floor, wherein the depression weld extends completely through the depression floor and joins the shell interior surfaces of the first and second stamped metal shells together.

2. The vehicle suspension component of claim 1, wherein at least one of the first or second stamped metal shells includes a shell connection node portion that is integrally formed in the at least one stamped metal shell and is configured to receive a connection node, and the connection node is configured to connect the vehicle suspension component to the rest of a vehicle suspension system.

3. The vehicle suspension component of claim 1, wherein the first and second stamped metal shells are complementary in shape and form a clam-shell or a box design, and one or more connection nodes are sandwiched between the first and second stamped metal shells.

4. The vehicle suspension component of claim 1, wherein the stiffening feature is formed in both the first and second stamped metal shells and each of the first and second stamped metal shells includes a depression, a depression perimeter that at least partially surrounds the corresponding depression, a depression sidewall that is connected to the corresponding depression perimeter, a depression floor that is connected to the corresponding depression sidewall, and a depression weld that is at least partially located in both of the depression floors, wherein the depression weld joins the shell interior surfaces of the first and second stamped metal shells together.

5. The vehicle suspension component of claim 1, wherein the stiffening feature with the depression weld forms a welded double thickness section that increases the stiffness of the vehicle suspension component, and the welded double thickness section is located towards the middle of the vehicle suspension component such that it is inboard of an outer periphery of the vehicle suspension component.

6. The vehicle suspension component of claim 1, wherein the depression sidewall extends from the depression perimeter down to the depression floor and includes a first radius between the depression perimeter and the depression sidewall and a second radius between the depression sidewall and the depression floor.

7. The vehicle suspension component of claim 6, wherein the first radius and the second radius are equal to or greater than a thickness of the first or second stamped sheet metal shell in which they are formed.

8. The vehicle suspension component of claim 1, wherein the depression floor forms a foundation of the stiffening feature and is substantially flat or planar such that it can lay flat against the other of the first or second stamped metal shells.

9. The vehicle suspension component of claim 1, wherein the width Y of the stiffening feature is at least 50% of the corresponding width W of the vehicle suspension component.

10. The vehicle suspension component of claim 1, wherein the stiffening feature further includes a cutout formed in the depression floors of both of the first and second stamped metal shells, the cutout is located at least partially inboard of the depression weld.

11. The vehicle suspension component of claim 1, wherein the vehicle suspension component is a lower control arm that includes a ball joint connection node for attachment to a ball joint, a bushing pin connection node for attachment to a bushing pin, and a bushing connection node for attachment to a bushing.

12. A vehicle suspension component, comprising:
a first stamped metal shell that includes a shell interior surface and a shell exterior surface;
a second stamped metal shell that includes a shell interior surface and a shell exterior surface; and
a stiffening feature that is formed in at least one of the first or second stamped metal shells and includes a depression, a depression perimeter that at least partially surrounds the depression, a depression sidewall that is connected to the depression perimeter, a depression floor that is connected to the depression sidewall, and a depression weld that is at least partially located in the depression floor, the depression weld joins the shell interior surfaces of the first and second stamped metal shells together, wherein at least one of the first or second stamped metal shells is made from a next generation steel that has a yield strength, after forming, that is equal to or greater than 780 MPa along a load-bearing path and has an elongation, after forming, that is equal to or greater than 30%.

13. The vehicle suspension component of claim 2, wherein the at least one stamped metal shell has an average thickness of between 1.0 mm and 5.0 mm and is made from a next generation steel that is selected from the group consisting of: advanced high-strength steels (AHSS), third generation steels (Gen3 steels), fourth generation steels (Gen4 steels), or press hardenable or hot stamped steels.

14. A vehicle suspension component, comprising:
a first stamped metal shell that includes a shell interior surface and a shell exterior surface;
a second stamped metal shell that includes a shell interior surface and a shell exterior surface; and
a stiffening feature that is formed in at least one of the first or second stamped metal shells and includes a depression, a depression perimeter that at least partially surrounds the depression, a depression sidewall that is connected to the depression perimeter, a depression floor that is connected to the depression sidewall, and a depression weld that is at least partially located in the depression floor, the depression weld loins the shell interior surfaces of the first and second stamped metal shells together, the depression sidewall extends from the depression perimeter down to the depression floor and includes a first radius between the depression perimeter and the depression sidewall and a second radius between the depression sidewall and the depression floor, wherein the depression sidewall has a varying height dimension x that is between 4.5 mm and 45 mm, inclusive.

15. A vehicle suspension component, comprising:
a first stamped metal shell that includes a shell interior surface and a shell exterior surface;
a second stamped metal shell that includes a shell interior surface and a shell exterior surface; and
a stiffening feature that is formed in at least one of the first or second stamped metal shells and includes a depression, a depression perimeter that at least partially surrounds the depression, a depression sidewall that is connected to the depression perimeter, a depression floor that is connected to the depression sidewall, and a depression weld that is at least partially located in the depression floor, the depression weld loins the shell interior surfaces of the first and second stamped metal shells together, wherein the depression weld is a curvilinear laser weld that follows a perimeter of the depression floor such that it is located inboard of the depression sidewall by a dimension Z, and the depression weld is located closer to the corresponding sidewall (dimension Z) than a middle of the depression floor for at least a portion of a length of the depression weld.

16. The vehicle suspension component of claim 15, wherein the depression weld is spaced from the depression sidewall by a distance Z that is between 1.5 mm and 10 mm, inclusive, for at least a portion of a length of the depression weld.

17. The vehicle suspension component of claim 15, wherein the depression weld is a continuous weld that extends around a weld loop within the depression floor.

18. A vehicle suspension component, comprising:
a first stamped metal shell that includes a shell interior surface and a shell exterior surface;
a second stamped metal shell that includes a shell interior surface and a shell exterior surface; and
a stiffening feature that is formed in at least one of the first or second stamped metal shells and includes a depression, a depression perimeter that at least partially surrounds the depression, a depression sidewall that is connected to the depression perimeter, a depression floor that is connected to the depression sidewall, and a depression weld that is at least partially located in the depression floor, the depression weld loins the shell interior surfaces of the first and second stamped metal shells together, wherein the stiffening feature further includes a cutout formed in the depression floor and a step formed at a periphery of the cutout, the cutout is located at least partially inboard of the depression weld.

19. A method for manufacturing a vehicle suspension component, the method comprising the steps of:
stamping a first stamped metal shell that includes a shell interior surface and a shell exterior surface;
stamping a second stamped metal shell that includes a shell interior surface and a shell exterior surface, wherein at least one of the first and second stamped metal shells has a stiffening feature that includes a depression, a depression perimeter that at least partially surrounds the depression, a depression sidewall that is connected to the depression perimeter, and a depression floor that is connected to the depression sidewall; and joining the shell interior surfaces of the first and second stamped metal shells together by forming a depression weld that is at least partially located in the depression floor and extends completely through the depression floor.

* * * * *

UNITED STATES PATENT AND TRADEMARK OFFICE
CERTIFICATE OF CORRECTION

| | |
|---|---|
| PATENT NO. | : 11,400,781 B2 |
| APPLICATION NO. | : 17/257672 |
| DATED | : August 2, 2022 |
| INVENTOR(S) | : Clifford J. Hoschouer |

It is certified that error appears in the above-identified patent and that said Letters Patent is hereby corrected as shown below:

In the Claims

Claim 13; Column 11; Line 48: Replace "The vehicle suspension component of claim 2....." with "The vehicle suspension component of claim 12....."

Signed and Sealed this
Eighteenth Day of October, 2022

Katherine Kelly Vidal
*Director of the United States Patent and Trademark Office*